United States Patent
Dankberg et al.

(10) Patent No.: US 7,944,993 B2
(45) Date of Patent: May 17, 2011

(54) DOWNSTREAM BROAD BEAM DIVERSITY

(75) Inventors: Mark D. Dankberg, Encinitas, CA (US); Charles N. Pateros, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 566 days.

(21) Appl. No.: 11/843,089

(22) Filed: Aug. 22, 2007

(65) Prior Publication Data

US 2008/0144734 A1    Jun. 19, 2008

Related U.S. Application Data

(60) Provisional application No. 60/823,126, filed on Aug. 22, 2006, provisional application No. 60/823,127, filed on Aug. 22, 2006, provisional application No. 60/823,128, filed on Aug. 22, 2006, provisional application No. 60/823,131, filed on Aug. 22, 2006.

(51) Int. Cl.
*H04L 27/00* (2006.01)
(52) U.S. Cl. ........ 375/299; 375/267; 375/296; 370/508; 455/13.1; 455/13.2
(58) Field of Classification Search ............... 342/357.1; 455/13.1, 13.2; 375/229, 259–261, 295–296, 375/299, 267–269; 370/464, 498, 503, 507–508
See application file for complete search history.

(56) References Cited

U.S. PATENT DOCUMENTS

| | | | |
|---|---|---|---|
| 5,446,756 A | 8/1995 | Mallinckrodt | |
| 5,828,947 A | 10/1998 | Michel et al. | |
| 5,832,379 A | 11/1998 | Mallinckrodt | |
| 5,940,753 A | 8/1999 | Mallinckrodt | |
| 5,949,766 A | 9/1999 | Ibanez-Meier et al. | |
| 5,995,832 A | 11/1999 | Mallinckrodt | |
| 6,515,980 B1 | 2/2003 | Bottomley | |
| 6,683,924 B1 | 1/2004 | Ottosson et al. | |
| 6,859,652 B2 | 2/2005 | Karabinis et al. | |
| 6,956,814 B1 * | 10/2005 | Campanella | 370/210 |
| 7,206,364 B2 | 4/2007 | Miller | |
| 7,269,235 B2 | 9/2007 | Miller | |
| 7,574,224 B2 * | 8/2009 | Lane et al. | 455/502 |
| 2002/0027957 A1 * | 3/2002 | Paulraj et al. | 375/267 |

(Continued)

OTHER PUBLICATIONS

Notice of Allowance for U.S. Appl. No. 11/843,474 mailed on Oct. 1, 2010; 10 pages.

(Continued)

*Primary Examiner* — David C. Payne
*Assistant Examiner* — James M Perez
(74) *Attorney, Agent, or Firm* — Kilpatrick Townsend & Stockton LLP

(57) ABSTRACT

A satellite communication system is provided according to one embodiment of the invention. The satellite communication system includes a plurality of satellites, a gateway and a plurality of subscriber terminals in communication with the gateway through the satellites. The gateway includes a plurality of antennas pointed toward a specific satellite. Each antenna may transmit the same signal to the satellites. The signal may be an OFDM signal. The subscriber terminals may include an antenna pointed toward at least one of the satellites and configured to receive OFDM signals. The OFDM signal time is proportional to the longest transmission time difference of all subscriber terminals within the geographic area serviced by the satellites. The transmission time difference is a measure of the difference between the transmission time of a signal over the longest transmission path and the transmission time of a signal over the shortest transmission path at a subscriber terminal.

20 Claims, 8 Drawing Sheets

U.S. PATENT DOCUMENTS

| | | |
|---|---|---|
| 2002/0050008 A1 | 5/2002 | Sloderbeck |
| 2002/0061730 A1 | 5/2002 | Hart et al. |
| 2002/0132579 A1 | 9/2002 | Hart et al. |
| 2002/0136191 A1* | 9/2002 | Draim et al. .................. 370/344 |
| 2003/0050008 A1 | 3/2003 | Patterson et al. |
| 2004/0095907 A1 | 5/2004 | Agee et al. |
| 2005/0227618 A1 | 10/2005 | Karabinis et al. |
| 2006/0126750 A1* | 6/2006 | Friedman ...................... 375/260 |
| 2008/0143589 A1 | 6/2008 | Dankberg et al. |
| 2008/0144596 A1 | 6/2008 | Dankberg et al. |
| 2008/0214107 A1 | 9/2008 | Dankberg et al. |
| 2008/0304555 A1* | 12/2008 | Larsson ........................ 375/211 |
| 2010/0061293 A1* | 3/2010 | Schiff ........................... 370/316 |

OTHER PUBLICATIONS

Non-Final Office Action for U.S. Appl. No. 11/843,474 mailed on Jul. 12, 2010; 13 pages.

Notice of Allowance for U.S. Appl. No. 11/843,429 mailed on Dec. 29, 2010; 12 pages.

Non-Final Office Action for U.S. Appl. No. 11/843,429 mailed on Jul. 12, 2010; 11 pages.

Notice of Allowance for U.S. Appl. No. 11/843,096 mailed on Dec. 9, 2010; 12 pages.

Non-Final Office Action for U.S. Appl. No. 11/843,096 mailed on Jul. 12, 2010; 13 pages.

\* cited by examiner

DOWNSTREAM BROAD BEAM DIVERSITY

CROSS-REFERENCES TO RELATED APPLICATIONS

This application is a non-provisional, and claims the benefit, of commonly assigned U.S. Provisional Application No. 60/823,126, filed Aug. 22, 2006, entitled "Feeder Link Polarization Diversity," the entirety of which is herein incorporated by reference for all purposes.

This application is a non-provisional, and claims the benefit, of commonly assigned U.S. Provisional Application No. 60/823,127, filed Aug. 22, 2006, entitled "Downstream Broad Beam Diversity," the entirety of which is herein incorporated by reference for all purposes.

This application is a non-provisional, and claims the benefit, of commonly assigned U.S. Provisional Application No. 60/823,128, filed Aug. 22, 2006, entitled "Downstream Broad Beam Diversity With Interference Cancellation," the entirety of which is herein incorporated by reference for all purposes.

This application is a non-provisional, and claims the benefit, of commonly assigned U.S. Provisional Application No. 60/823,131, filed Aug. 22, 2006, entitled "Upstream Broad Beam Diversity," the entirety of which is herein incorporated by reference for all purposes.

This application is related to commonly assigned U.S. patent application Ser. No. 11/843,474, filed Aug. 22, 2007, entitled "Cooperative Orthogonal Multi-Satellite Communication System," the entirety of which is herein incorporated by reference for all purposes.

This application is related to commonly assigned U.S. patent application Ser. No. 11/843,096, filed Aug. 22, 2007, entitled "Downstream Broad Beam Diversity With Interference Cancellation," the entirety of which is herein incorporated by reference for all purposes.

This application is related to commonly assigned U.S. patent application Ser. No. 11/843,429, filed Aug. 22, 2007, entitled "Upstream Broad Beam Diversity," the entirety of which is herein incorporated by reference for all purposes.

BACKGROUND OF THE INVENTION

This disclosure relates in general to satellite communication systems and, but not by way of limitation, to multipath downstream satellite communication systems utilizing orthogonal frequency-division multiplexing.

Subscriber terminals can employ small aperture wide beam width antennas that can collect potentially interfering signals from satellites near the target satellite. For example, a mobile subscriber terminal may employ an antenna with a larger beam width in order to more easily point toward the target satellite as the subscriber terminal is in motion. These potentially interfering signals can impact the reception of the target signal from the target satellite. Often successive interference cancellation techniques may be employed to remove these interfering signals from the target signal with varying degrees of success.

Accordingly, there is a need in the art to provide a satellite communication system that compensates for the effects of interference from nearby satellites.

BRIEF SUMMARY OF THE INVENTION

In one embodiment, the present disclosure provides for a satellite communication system. The satellite communication system includes a plurality of satellites, a gateway and a plurality of subscriber terminals in communication with the gateway through the satellites. The gateway includes a plurality of antennas each pointed toward a specific satellite. Each antenna may transmit the same signal to the satellites. The signal may be an OFDM signal. The subscriber terminals may include an antenna pointed toward at least one of the satellites and configured to receive OFDM signals. The OFDM signal time is proportional to the longest transmission time difference of all subscriber terminals within the geographic area serviced by the satellites. The transmission time difference is a measure of the difference between the transmission time of a signal over the longest transmission path and the transmission time of a signal over the shortest transmission path to a subscriber terminal.

The number of orthogonal sub-carriers within the OFDM signal may be proportional to the OFDM symbol time. The gateway modulates the signals using quadrature amplitude modulation, phase-shift keying or other digital keying and/or modulating schemes. The system may include three satellites and three antennas at the gateway. The satellites may be within neighboring, adjacent, and/or the same orbital slots. The subscriber terminals may be in a fixed position, mobile, seaborne, spaceborne, airborne, etc. The antenna at the subscriber terminals may be a broad beam antenna with a large aperture.

A method for communicating with a plurality of subscriber terminals through a plurality of satellites using orthogonal frequency-division multiplexing (OFDM) is also provided according to another embodiment of the invention. The plurality of subscriber terminals may be located within a geographic area. The method may convert a data stream into an OFDM signal. The OFDM symbol time may be proportional to the largest transmission time difference at a subscriber terminal within a geographic area serviced by the satellites. This transmission time difference may be calculated as the difference between the transmission time of a signal over the longest transmission path and the transmission time of a signal over the shortest transmission path to a subscriber terminal. The transmission time difference may be calculated for each subscriber terminal within the geographic area serviced by the satellites. The largest difference may be used to set the OFDM symbol time. Once the OFDM signal is prepared the signal is transmitted through a plurality of antennas.

Another satellite communication system is also provided. The satellite communication system includes a plurality of satellites, a gateway with a plurality of antennas, and a fixed reference terminal. The system may also include a plurality of mobile and/or fixed subscriber terminals. The plurality of antennas at the gateway are each pointed toward one of the satellites. The fixed reference terminal may include one or more antennas pointed toward the plurality of satellites and configured to receive signals from the gateway through the plurality of satellites. The gateway may be configured to precorrect the signals transmitted from the gateway to the plurality of mobile subscriber terminals. The timing precorrection may be based on the time delay between signals received at the reference terminal. Timing delay information may be recorded at the reference terminal and transmitted to the gateway through the satellites or via an alternate technique such as over the Internet, etc.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, the present disclosure provides for a satellite communication system that includes space-time codes transmitted through multiple satellites. For instance, a gateway may transmit the same signal from more than one antenna through more than one satellite to a plurality of subscriber terminals. Embodiments of the invention may precorrect the signals at the gateway prior to transmission such that the signals are synchronized when received at the subscriber terminals within a geographic area serviced by the satellites. The precorrection may include providing delays in the signals and/or using an OFDM signal time that is proportional to the longest transmission time difference at the subscriber terminals. Various other embodiments of the invention will be described in detail below.

Figure 1:
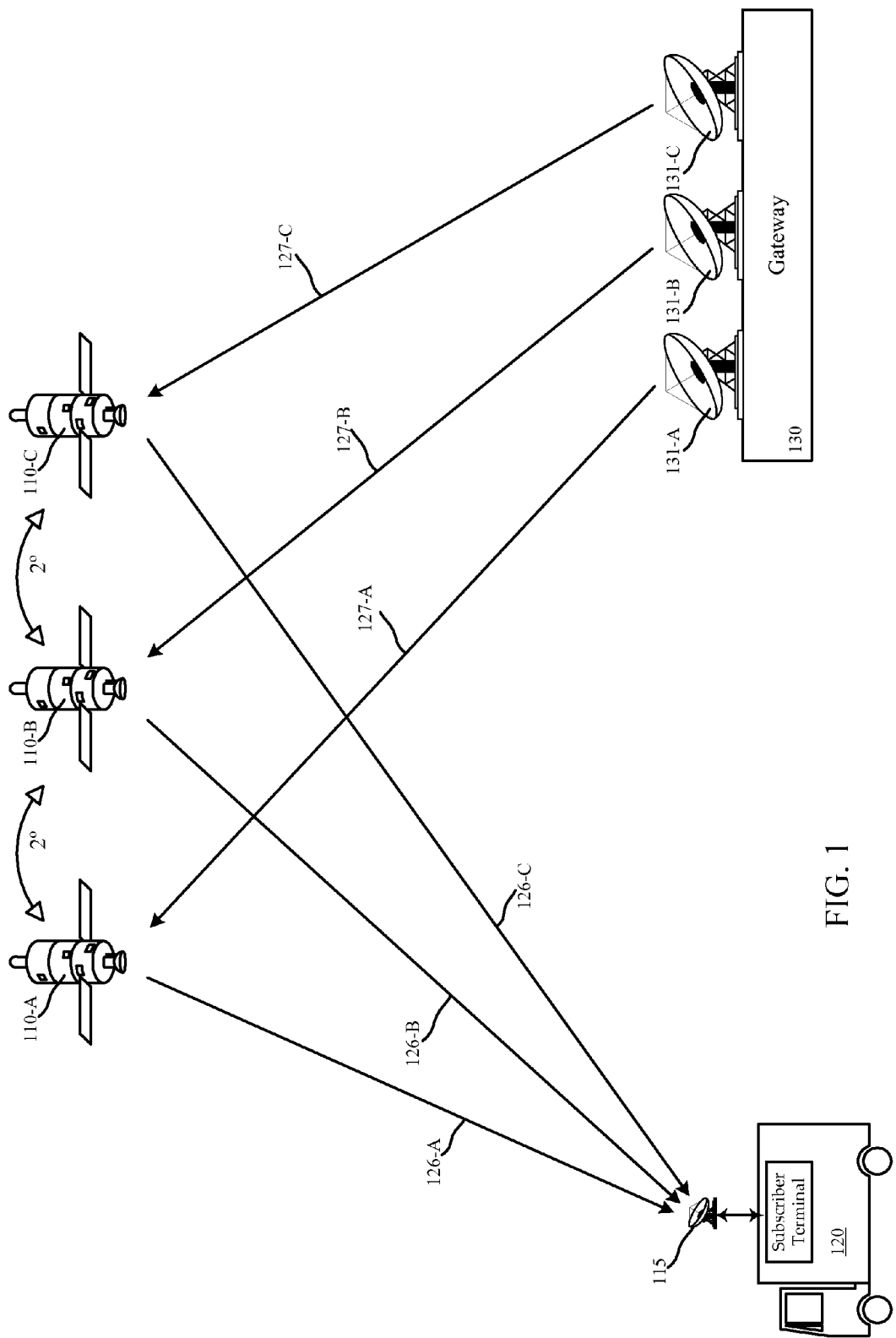
FIG. 1 shows a satellite communication system including a gateway with three antennas, three satellites and a mobile subscriber terminal according to one embodiment of the invention.

FIG. 1 shows a satellite communication system that includes a gateway 130 with three antennas 131, three satellites 110 and mobile subscriber terminal 120 according to one embodiment of the invention. As shown, the gateway 130 communicates with the subscriber terminal over three feeder links 127 and three service links 126. The figure shows a mobile subscriber terminal 120 as a truck with an antenna 115. Only one subscriber terminal is shown for clarity, any number of subscriber terminals may be used. The subscriber terminal antennas 115 may be pointed toward a target satellite and/or satellites 110. The antennas 115 may have small apertures and/or large beam widths, for example, the beam width may be 6°. In other embodiments the antennas beam width may be 3°, 4°, 5°, 7°, 8°, 9°, 10°, etc. The subscriber terminals 120 may be stationary, mobile, airborne, seaborne, spaceborne, etc. If more than one subscriber terminal 120 is used, these subscriber terminals may be located within a geographic area serviced by the satellites. For example, the subscriber terminals 120 may be located within the continental United States (a CONUS beam) or within a smaller geographic area that depends on the beam size of the satellites 110. Various beams sizes may be employed.

The satellites 110 may operate as relay, switching or bent pipe satellites. In one embodiment, the satellites 110 may receive signals from the gateway 120 and retransmit the signals to the subscriber terminals. The satellites 110 may also be found within different orbital slots, that is, they may be about 2° apart within a geostationary orbit. These orbital slots may be adjacent or neighboring orbital slots. The satellites 110 may transmit signals within overlapping broad and/or narrow beams. The beam sizes may vary between antennas. For example, a first satellite 110-A may have a large beam size while a second satellite 110-B may have a small beam size. While three satellites 110 are shown, various other combinations of satellites may be employed. For example, 2, 4, 5, 6, 7, 8, 9, 10 or more satellites may be used.

Satellites 110 each receive the same signal 127 from three separate antennas 131 at the gateway 130. These signals are transmitted to the subscriber terminal 120 as shown in FIG. 1. Accordingly, the subscriber terminal 120 effectively receives the same signal from three different satellites 110 over three different paths. Because the three signals travel different paths through different satellites, the three signals arrive at the subscriber terminal 120 at different times and can in some cases be considered interference in relation to each other signal.

The three signals may be transmitted using orthogonal frequency-division multiplexing (OFDM). OFDM uses a large number of closely-spaced orthogonal sub-carriers that are modulated with a conventional modulation scheme, for example, quadrature amplitude modulation or phase shift keying, at a low symbol rate. The orthogonal sub-carriers with the allotted frequency band may be determined using a Fast Fourier Transform (FFT). In one embodiment, the symbol time may be significantly longer than the time difference between the longest and shortest paths between the gateway and a subscriber terminal.

The OFDM modulation scheme may be combined with a multiple access scheme such as, for example, using frequency, time or coding, to communicate more than signal to more than one subscriber terminal 120. For example, Orthogonal Frequency Division Multiple Access (OFDMA) may be used. Frequency-division multiple access can be achieved by assigning different OFDM sub-channels to different users. The number of sub-channels assigned to a user may depend on the OFDM symbol time, the needed symbol rate, and/or the quality of service required at the subscriber terminal. As another example, the OFDM signal may be combined with time division multiple-access (TDMA) or time-domain statistical multiplexing by assigning each of the various subscriber terminals a communication timeslot. In another example, code division multiple-access (CDMA) may be employed by assigning a high bandwidth spreading code to each user. Other multiple access techniques may be employed to provide multiple user access to the OFDM signals.

Figure 2:
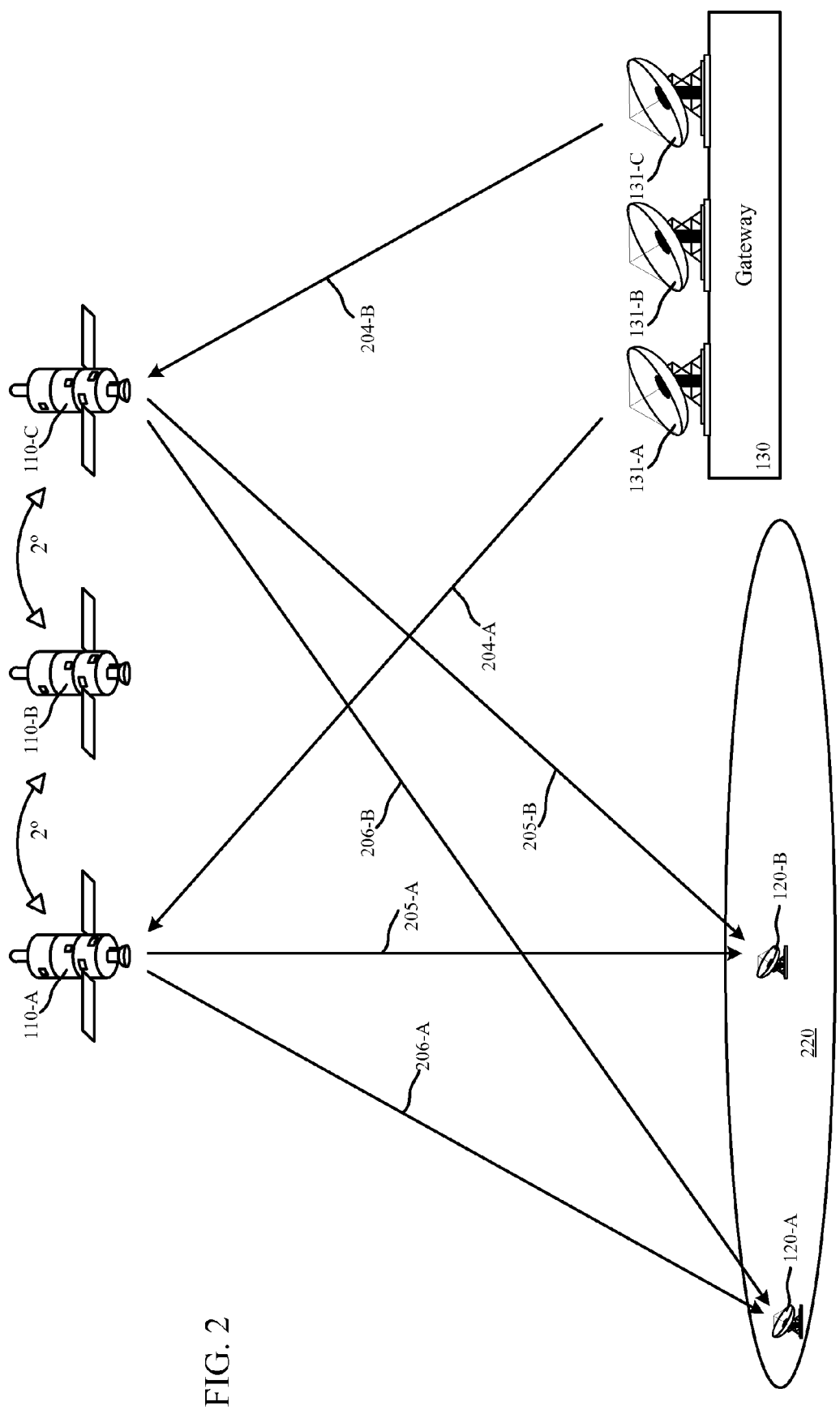
FIG. 2 shows the paths of two signals received at two different subscriber terminals 120 within a geographic area according to one embodiment of the invention.

Within a geographic area serviced by the satellites 110, the transmission path difference varies depending on where the subscriber terminal is located within the geographic area. FIG. 2 shows the paths of two signals transmitted from the gateway and received at two different subscriber terminals 120 within a geographic area 220 according to one embodiment of the invention. The first antenna 131-A at the gateway 130 transmits signals to the first satellite 110-A over a first feeder link path 204-A. The second antenna 131-B at the gateway 130 transmits signals to the third satellite 110-C over a second feeder link path 204-C. Both satellites 110-A, 110-C retransmit signals from the gateway to each subscriber terminal 120 within the geographic area 220. FIG. 2 shows two subscriber terminals 120-A, 120-B within the geographic area. In this example, the two subscriber terminals 120 receive a signal from the first and second satellites 110-A, 110-C. The difference between the longest and shortest transmission time may be calculated at each subscriber terminal. The largest time difference or average time difference may be used to precorrect for these delays at the gateway. Various embodiments of the present invention may provide methods to compensate or correct for the transmission differences of the signal arriving over the different paths.

To compensate for the transmission delay between the two paths, the OFDM symbol time can be adjusted such that the symbol time is long enough so that symbols within each signal from the three satellites are received at each subscriber terminal during the same period of time. Accordingly, the symbol time may be set proportional to the longest transmission time difference of any subscriber terminal at any point within the geographic area 220, $T_{symbol} = A \cdot \Delta T$, where $A$ is a constant. In one embodiment of the invention A is 10±0.5. In other embodiments, A can be 4, 5, 6, 7, 8, 9, 11, 12, 13, 14, 15 or 16±0.5.

Figure 3A:
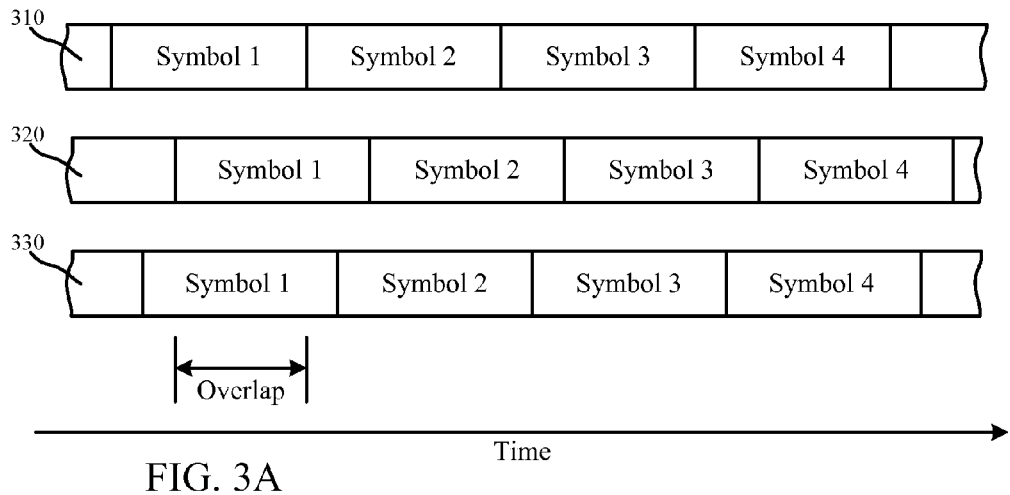
FIGS. 3A and 3B each show three signals received at a subscriber terminal from three satellites with different path delays according to one embodiment of the invention.
Figure 3B:
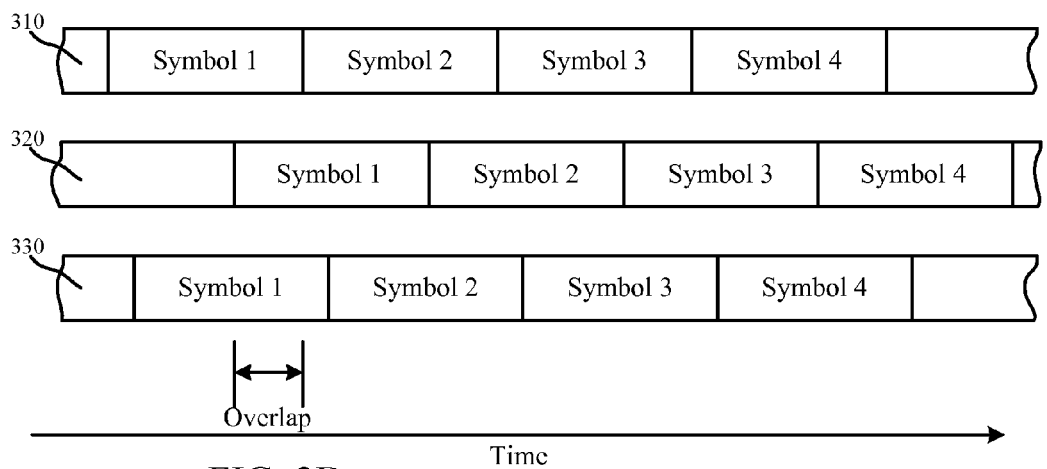

FIGS. 3A and 3B each show three signals 310, 320, 330 received at a subscriber terminal from three satellites with different path delays according to one embodiment of the invention. As shown in FIG. 3A, each corresponding symbol in each signal overlaps the same symbol in the other two signals. The overlap between signals in FIG. 3B is much shorter. Signal 320 is delayed relative to the other two signals. Increasing the symbol time at the gateway will provide greater overlap between the three signals.

Figure 3C:
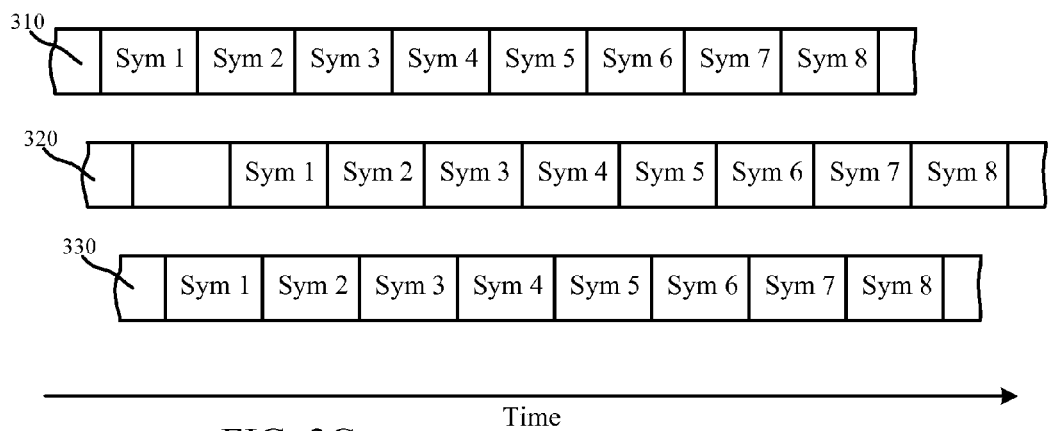
FIG. 3C shows three signals received at a subscriber terminal from three satellites with different path delays and a symbol time that is shorter than the path delay of two of the signals according to one embodiment of the invention.

FIG. 3C shows three signals 310, 320, 330 received at a subscriber terminal from three satellites with different path delays and a symbol time that is shorter than the path delay of two of the signals according to one embodiment of the invention. Accordingly, signal 320 may be considered interference by the other two signals 310, 330 and vice-versa. In this case, the symbol time may be lengthened in order to provide sufficient overlap between the symbols. In another embodiment, delays may be added in signals one and three 310, 330 to compensate for the misaligned signals. Other precorrection schemes known in the art may be used.

Figure 4A:
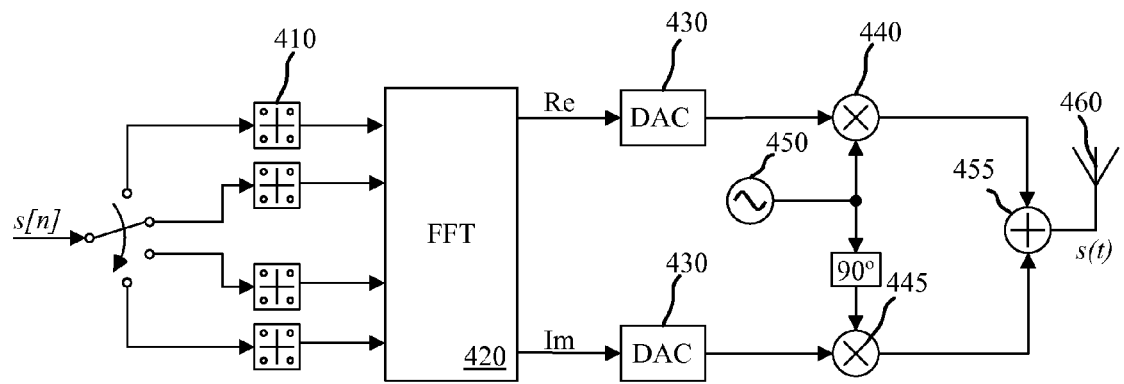
FIGS. 4A-C show a block diagram of an OFDM transmitter according to one embodiment of the invention.

FIG. 4A shows a block diagram of an OFDM transmitter according to one embodiment of the invention. An OFDM carrier signal is the sum of a number of orthogonal sub-carriers, with baseband data or different data on each sub-carrier being independently modulated commonly using some type of quadrature amplitude modulation (QAM), phase-shift keying (PSK), frequency shift keying (FSK) or other digital keying or modulation. This composite baseband signal is typically used to modulate a main RF carrier. The transmitter receives one or more serial signals, s[n]. The serial signals, s[n], may be a serial stream of binary digits. The serial signals may be demultiplexed into N parallel streams and each parallel signal mapped to a (possibly complex) symbol stream using some modulation constellation (QAM, PSK, etc.) 410. The constellations may be different and may carry a higher bit-rate than the other constellations. In other embodiments, multiple serial signals $s[n]_i$ may be received. Each of these serial signals may then be mapped to one or more symbols providing N parallel streams of data.

An inverse FFT 420 is computed on each set of symbols, giving a set of complex time-domain samples. The FFT also places each of the symbols within a sub-carrier frequency. These samples may be quadrature-mixed to a passband using techniques known in the art. The real and imaginary components are converted to the analogue domain using digital-to-analogue converters (DACs) 430. These analogue signals are then used to modulate cosine 440 and sine 445 waves at the carrier frequency, $f_c$ 450, respectively. These signals are then summed 455 to give the transmission signal, s(t) that is transmitted from the antenna 460. Other OFDM modulation schemes may also be used without deviating from the scope of the present invention.

Figure 4B:
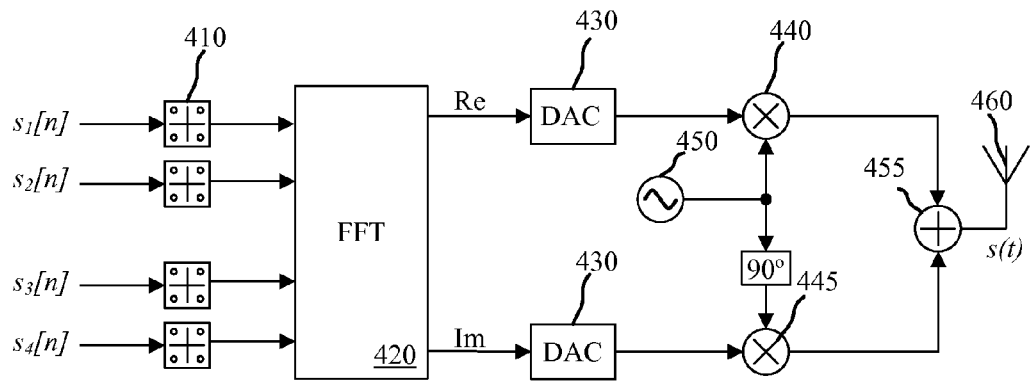
Figure 4C:
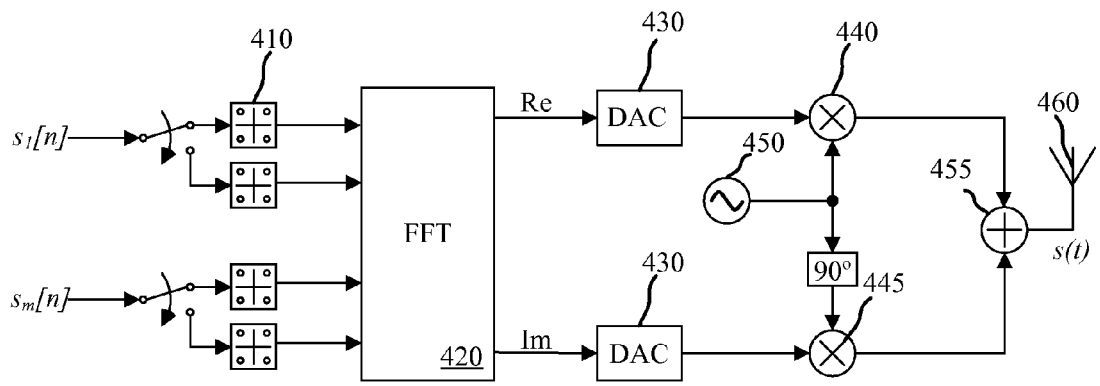

FIG. 4B shows another block diagram of an OFDM transmitter 400 according to another embodiment of the invention. In this embodiment, a plurality of data streams Si[n] are each modulated and transmitted on a sub-carrier rather than modulating the same signal onto the various sub-carriers. In another embodiment, multiple data streams may be encoded with a subset of available sub-carriers as shown in FIG. 4C. The number of sub-carriers used to transmit a single signal may depend on the symbol time, the required data rate and/or the available bandwidth.

Figure 5A:
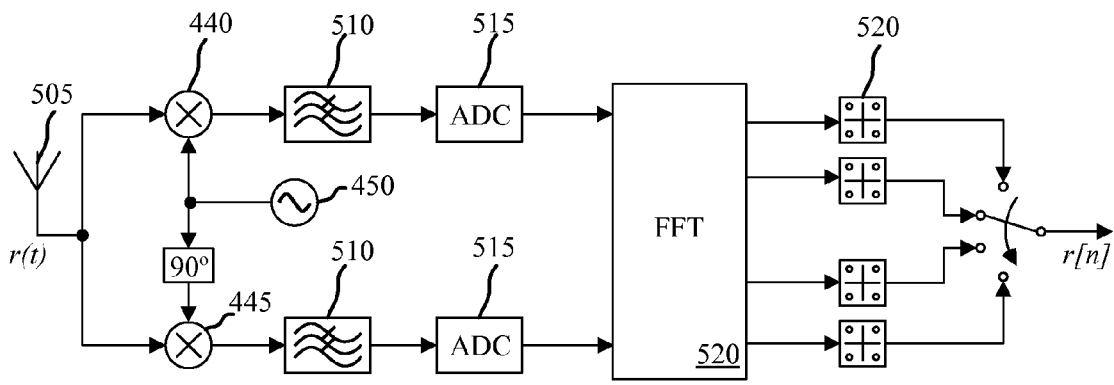
FIGS. 5A-C show a block diagram of an OFDM receiver according to one embodiment of the invention.

FIG. 5A shows a block diagram of an OFDM receiver according to another embodiment of the invention. The receiver picks up the signal r(t) at an antenna 505, which is then quadrature-mixed down to baseband using cosine 440 and sine 445 waves at the carrier frequency, $f_c$ 450. This also creates signals centered on $2f_c$, so low-pass filters are used to reject signals centered on $2f_c$. The baseband signals are then sampled and digitized using analogue-to-digital converters (ADCs) 515, and a forward FFT 520 is used to convert back to the frequency domain. The FFT 520 returns N parallel streams, each of which is converted to a binary stream using an appropriate symbol detector 530. These streams are then re-combined into a serial stream, s[n], which is an estimate of the original binary stream at the transmitter.

Figure 5B:
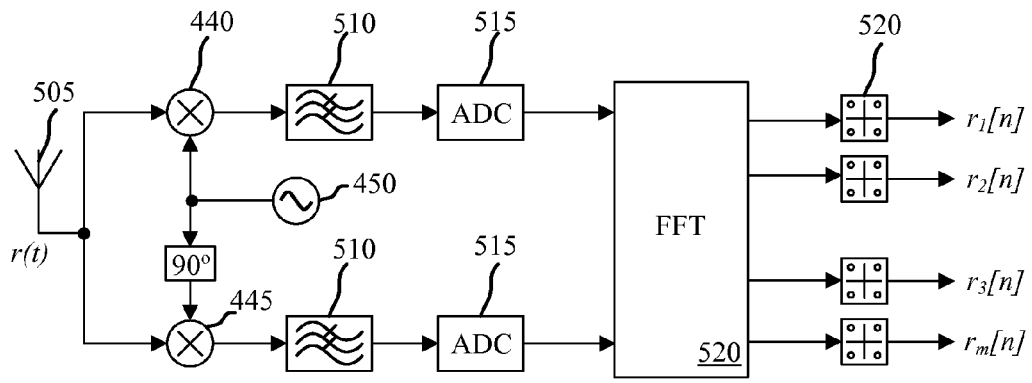
Figure 5C:
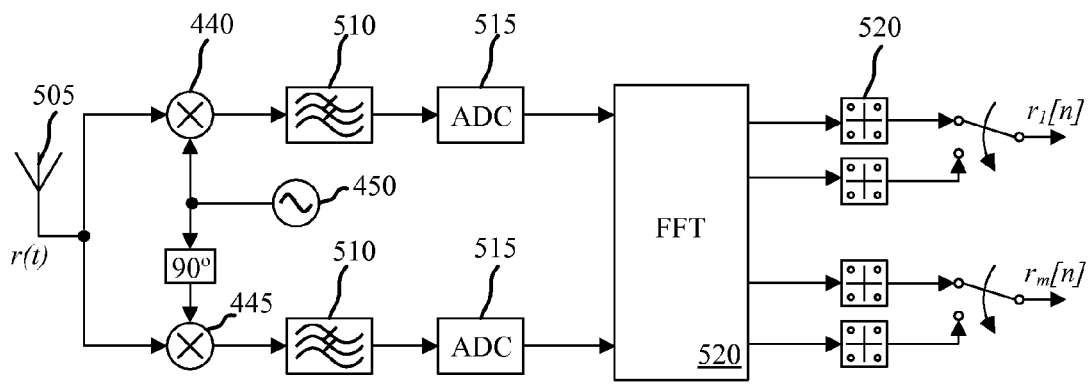

FIG. 5B shows a block diagram of another OFDM receiver according to another embodiment of the invention. In this block diagram each sub-carrier of the signal is encoded with a single data stream as shown in FIG. 4B. The receiver provides outputs for each or one of these received signals. In other embodiments of the invention, a subset of the total number of sub-carriers is used to encode a signal and decoded as shown in FIG. 5C. The size of the subset may vary depending on the symbol time, the required data rate and/or the available bandwidth.

If N sub-carriers are used, and each sub-carrier is modulated using M alternative symbols, the OFDM symbol alphabet consists of $M^N$ combined symbols. The low-pass equivalent OFDM signal can be expressed as:

$$v(t) = \sum_{k=0}^{N-1} X_k e^{j2\pi kt/T}, \quad 0 \le t \le T.$$

$X_k$ are the data symbols, N is the number of sub-carriers, and T is the OFDM symbol time. The sub-carrier spacing of 1/T makes symbol orthogonal over each symbol period; this property can be expressed as:

$$\frac{1}{T}\int_0^T e^{j2\pi(k_2-k_1)t/T}dt = \begin{cases} 1, & k_1 = k_2 \\ 0, & k_1 \ne k_2. \end{cases}$$

As shown in FIGS. 4C and 5C, in some embodiments of the invention a number of different signals are transmitted over n different orthogonal sub-carriers, where N=$\Sigma n_i$. A different symbol of the signal may be transmitted over each of the n orthogonal sub-carriers. The symbol rate for each of these signals may be determined by $$R = \frac{n}{T}.$$

If the symbol time is increased the number of orthogonal sub-carriers over which the can be increased in order to maintain the symbol rate. Accordingly, a single data stream transmitted from the gateway may include a plurality of signals, each signal transmitted of n subcarriers.

Figure 6:
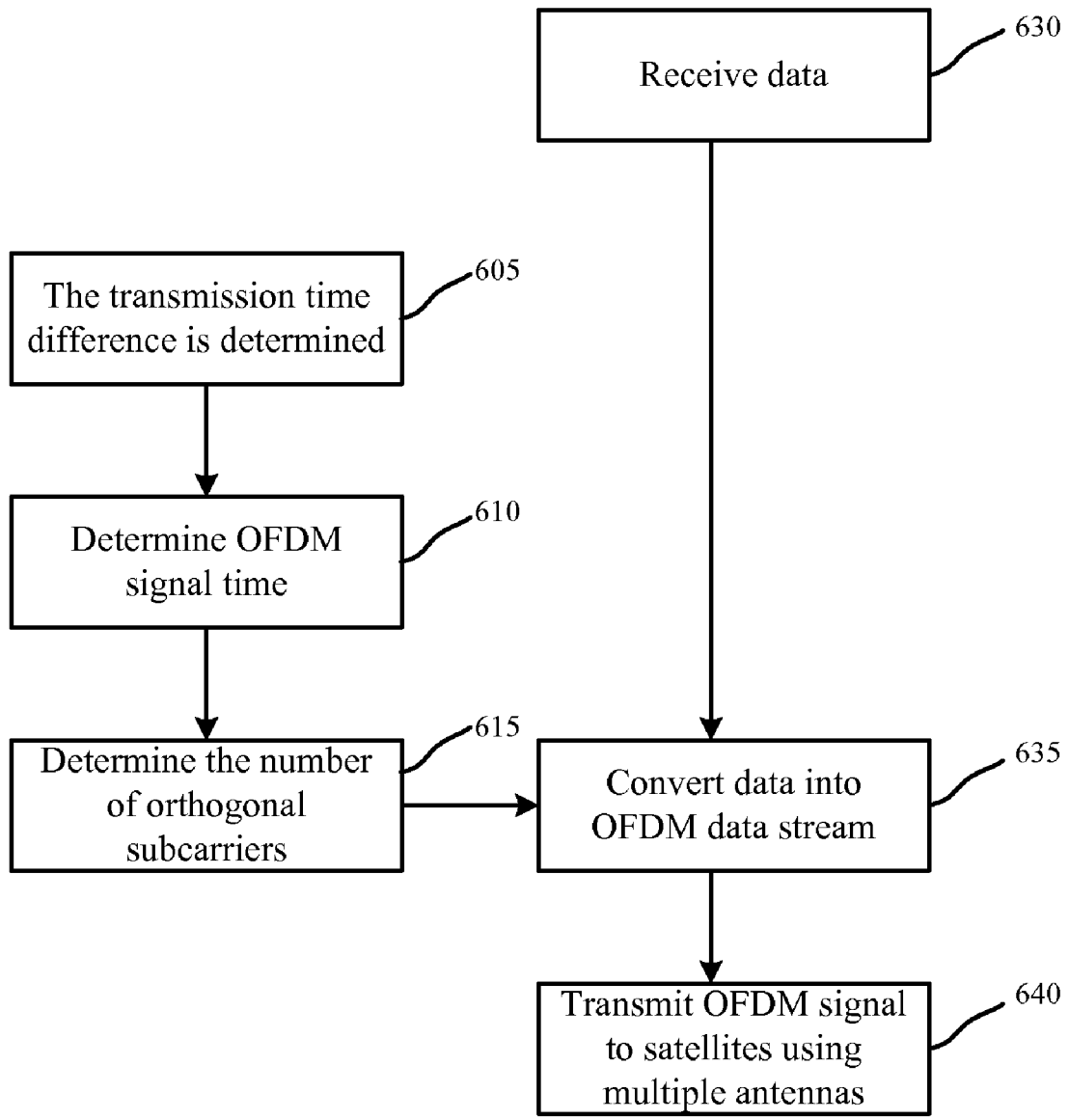
FIG. 6 is a flowchart depicting converting a data stream to an OFDM signal according to one embodiment of the invention.

FIG. 6 is a flowchart a method for converting a data stream into an OFDM signal according to one embodiment of the invention. The transmission time difference is determined for subscriber terminals within the geographic area serviced by the satellites at block 605. The transmission time difference may be determined by noting the amount of time it takes to transmit a signal to each subscriber terminal through each of the different satellites. The difference between the longest and shortest transmission time may be determined at each subscriber terminal or estimated at the gateway. The symbol time of the OFDM signal may then be set proportional to the maximum transmission time difference for subscriber terminals with the geographic area serviced by the satellites as discussed above. In another embodiment of the invention, the transmission time difference may be determined based on hypothetical subscriber terminals found in locations throughout the geographic area serviced by the satellites. In yet another embodiment of the invention, a fixed subscriber terminal that is centrally located within the geographic coverage area may be used to estimate timing pre-corrections.

The OFDM symbol time is then determined at block 610. The OFDM symbol time may be determined by multiplying the longest transmission difference by a constant, A, such that $T_{symbol}=A \cdot \Delta T$. The constant may depend on the properties of the space time codes employed at the subscriber terminal(s) to receive each symbol from the satellites. The OFDM symbol time may the same for each subscriber terminal within the geographic area or vary depending on the specific transmission differences at each subscriber terminal.

The number of orthogonal sub-carriers required to carry the signal at the proper data rate may then be determined at block 615. The number of orthogonal sub-carriers may be determined by n=$R \cdot T_{symbol}$.

The determining steps in blocks 605, 610, 615 may be dynamically performed as the transmission difference varies over time, for example, with a mobile subscriber terminal. In other embodiments, the determining steps may be determined for the geographic area serviced by the satellites and set until adjusted or based on a fixed reference terminal.

A data stream is received at block 630. The data stream is then converted into an OFDM stream using the OFDM time from block 610 and the number OFDM sub-carriers from block 615. Various coding and modulating techniques may be used as well as an inverse Fourier transform. The OFDM signal is then transmitted from the gateway to multiple satellites using multiple antennas at block 640.

Figure 7:
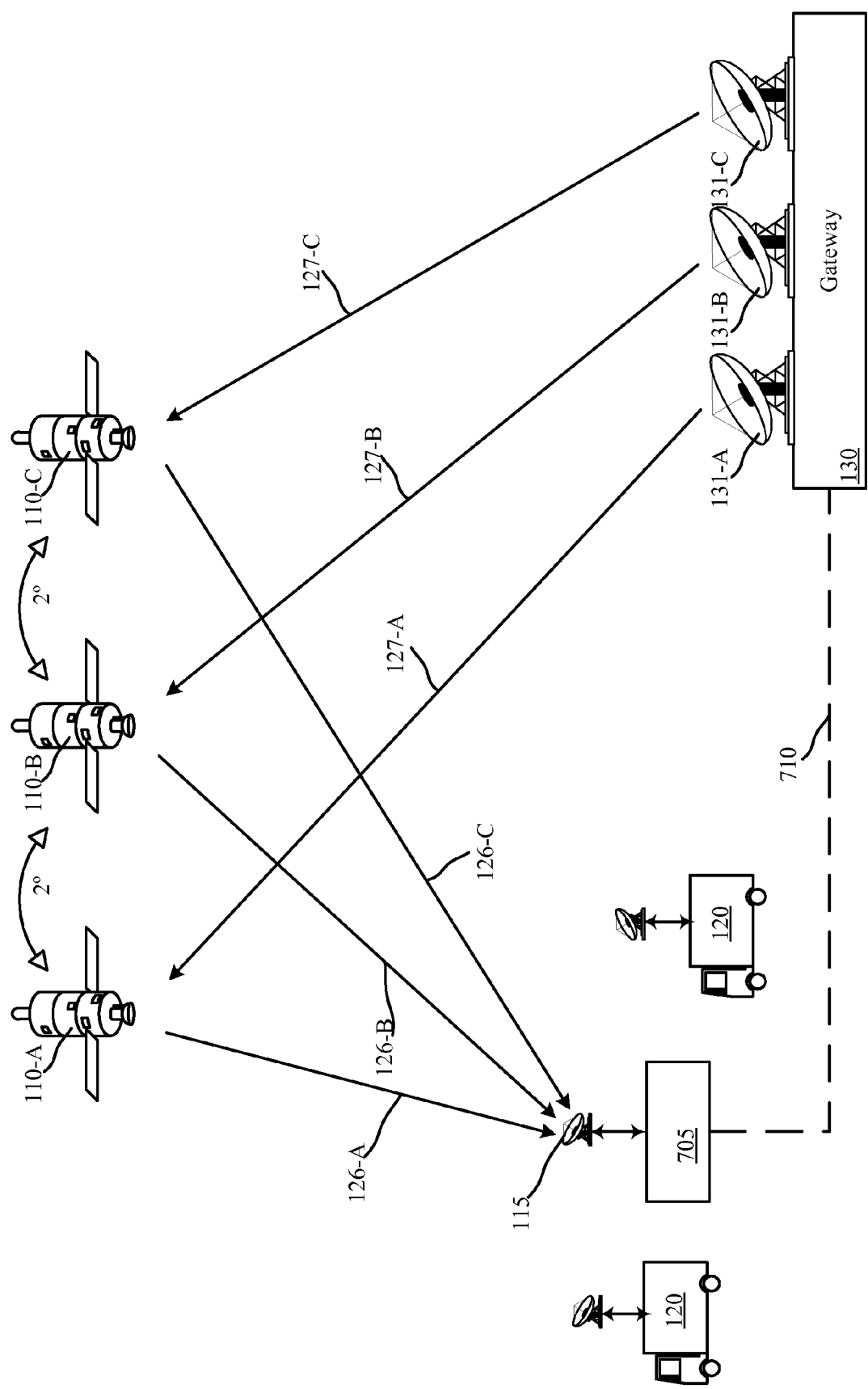
FIG. 7 shows a satellite communication system with a broad-beam reference terminal according to one embodiment of the invention.

FIG. 7 shows a satellite communication system with a broad-beam subscriber reference terminal 705 according to one embodiment of the invention. The reference terminal 705 is provided in a fixed (or, alternately, known) location and includes a single antenna 115 pointed toward all three satellites 110. The antenna may include a small aperture and a wide beam width, for example, 6°. The reference terminal 705 may also transmit signals to one or more mobile subscriber terminals 120, either directly using a local transmission scheme, or indirectly via the satellite communication system. The fixed reference terminal 705 provides the gateway 130 with the proper synchronization necessary to set up the space time codes that can be used with the mobile terminals 120 in the neighborhood around the reference terminal 705. Communication between the satellites 110 and the mobile subscriber terminals 120 are not shown in this figure for clarity. The signal delay may be provided to the gateway 130 through a return channel. As shown in the figure, the return channel may be a terrestrial channel 710, for example, over the Internet. In other embodiments, the return channel may occur through one of the satellites 110. Signal delay information may be determined by transmitting previously determined codes periodically throughout transmission. The reference terminal may use these codes to determine the relative delay between the signals received from the three satellites 110. The delay information may be used to precorrect the signals at the gateway. The precorrection may include lengthening the OFDM symbol time and/or the number of sub-carriers within an OFDM signal. In another embodiment, delays may be introduced within one or more of the signals. Various other precorrection schemes known in the art may also be used at the gateway.

In another embodiment of the invention, the reference terminal 705 is used solely to provide timing corrections to the gateway. For instance, the reference terminal 705 may be provided centrally within a geographic area serviced by the satellites 110. Having the reference terminal 705 so positioned, the reference terminal 705 may provide a reasonable average timing delay to the gateway 130 for subscriber terminals 120 located within the geographic area serviced by the satellites 110. While the signals received at each subscriber terminal 120 may have different delays, the average timing delay may provide a reasonable estimate of the timing delay required for subscriber terminals within the geographic area near the reference terminal. This geographic area may be a spot beam coverage area covered by the satellites 110. The geographic area may also include cells within the beam area of the satellites according to another embodiment of the invention. Each of the cells may have roughly the same delay profile. The cell may include a three dimensional volume wherein the correction calculated for the reference terminal may be applied to the whole cell.

In yet another embodiment of the invention, one or more of the mobile terminals may determine parameters of the pre-correction such as the delay between signals. If more than one mobile terminal is used, then an average or composite correction may be used at the gateway.

Figure 8:
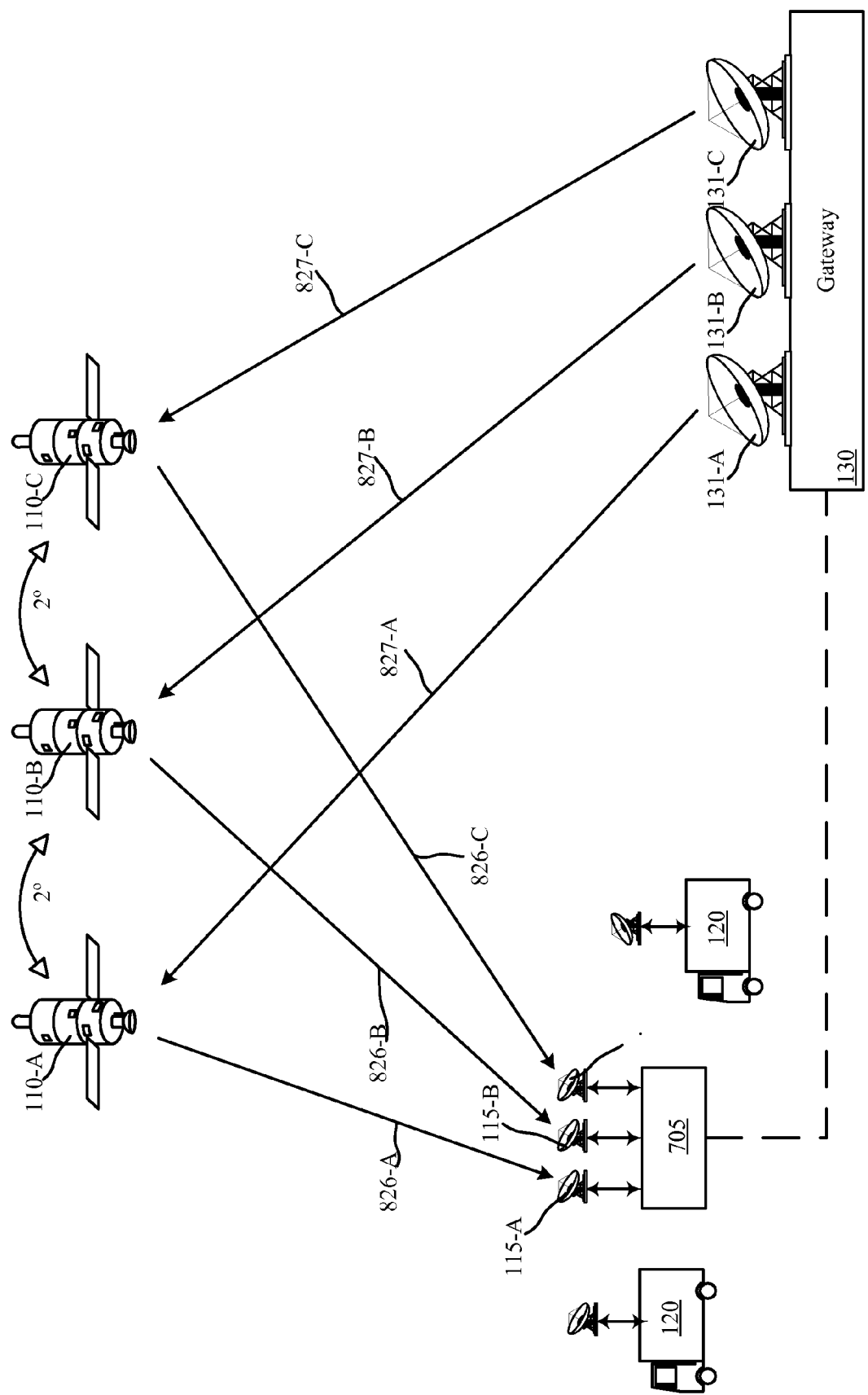
FIG. 8 shows a satellite communication system with a narrow-beam reference terminal with three antennas according to one embodiment of the invention.

FIG. 8 shows a satellite communication system with a narrow-beam reference terminal 705 with three antennas 115 according to another embodiment of the invention. These three antennas may be large aperture antennas 115 and pointed to communicate with only a single satellite 110. Here separate antennas are used at the gateway and at the reference terminal 705 for each signal. This technique may take advantage of large signal to noise ratios due to the large aperture antennas 115. In another embodiment of the invention, the gateway 130 itself may act as a reference terminal 705 and provide delay and precorrection data, if the subscriber terminals 120 are located in the same geographical area so that their delay profile will be consistent with the gateway 130.

Some embodiments of the invention disclose using three antennas at the gateway to transmit three signals through three satellites. In other embodiments of the invention, the gateway transmits 2, 4, 5, 6, 7, 8, 9, 10 or more signals through 2, 3, 4, 5, 6, 7, 8, 9, 10 or more satellites.

Embodiments of the invention may also include mobile subscriber terminals, airborne subscriber terminals, seaborne subscriber terminals, spaceborne subscriber terminals and/or fixed subscriber terminals. The subscriber terminals may also include GPS devices that determine the location of the subscriber terminal within the geographic area serviced by the satellites. This GPS data may be sent to the gateway to determine and/or estimate precorrection and/or timing of OFDM or other signals.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A satellite communication system comprising:
a plurality of satellites;
a gateway with a plurality of antennas, wherein one or more of the plurality of antennas is pointed toward more than one of the plurality of satellites, and the gateway is configured to transmit data using orthogonal frequency-division multiplexing (OFDM); and
a plurality of subscriber terminals, wherein each of the plurality of subscriber terminals include an antenna pointed toward at least two of the plurality of satellites and are configured to receive an OFDM signal from the gateway through the plurality of satellites,
wherein, for each subscriber terminal, the gateway determines the longest transmission time between the gateway and each subscriber terminal through each of the plurality of satellites;
wherein, for each subscriber terminal, the gateway determines the shortest transmission time between the gateway and each subscriber terminal through each of the plurality of satellites;
wherein, for each subscriber terminal, the gateway determines the transmission time difference between the longest transmission time and the shortest transmission time for each subscriber terminal;

wherein the gateway determines the largest transmission time difference among the transmission time differences for each of the plurality of subscriber terminals;

wherein the gateway determines an OFDM symbol time that is greater than the largest transmission time difference;

wherein the gateway receives a data stream;

wherein the gateway converts the data stream into a plurality of data symbols multiplexed over a plurality of orthogonal sub-carriers to create an OFDM symbol stream, each data symbol, exclusive of the cyclic prefix, having the same symbol time as the OFDM symbol time; and wherein the gateway transmits the OFDM symbol stream to the plurality of subscriber terminals through the plurality of satellites.

2. The satellite communication system according to claim 1, wherein the number of orthogonal sub-carriers within the OFDM signal is proportional to the OFDM symbol time.

3. The satellite communication system according to claim 1, wherein the gateway is configured to modulate the signal using quadrature amplitude modulation.

4. The satellite communication system according to claim 1, wherein the gateway is configured to modulate the signal using phase-shift keying.

5. The satellite communication system according to claim 1, wherein the plurality of satellites comprise three satellites.

6. The satellite communication system according to claim 1, wherein the plurality of antennas comprise three antennas.

7. The satellite communication system according to claim 1, wherein the plurality of satellites are in adjacent orbital slots.

8. The satellite communication system according to claim 1, wherein the subscriber terminals are mobile.

9. The satellite communication system according to claim 1, wherein the subscriber terminal antenna is a broad beam antenna.

10. A method occurring at a gateway for communicating with a plurality of subscriber terminals through a plurality of satellites using orthogonal frequency-division multiplexing (OFDM), wherein the plurality of subscriber terminals are located within a geographic area, the method comprising:

determining the longest transmission time between the gateway and each subscriber terminal through each of the plurality of satellites;

determining the shortest transmission time between the gateway and each subscriber terminal through each of the plurality of satellites;

determining the transmission time difference between the longest transmission time and the shortest transmission time for each subscriber terminal;

determining the largest transmission time difference among the transmission time differences for each of the plurality of subscriber terminals;

determining an OFDM symbol time that is greater than the largest transmission time difference;

receiving a data stream;

converting the data stream into a plurality of data symbols multiplexed over a plurality of orthogonal sub-carriers to create an OFDM symbol, each data symbol having the same symbol time, exclusive of the cyclic prefix, as the OFDM symbol time; and transmitting the OFDM symbol to the plurality of subscriber terminals through the plurality of satellites.

11. The method according to claim 10, wherein the number of orthogonal sub-carriers within the OFDM signal is proportional to the OFDM symbol time.

12. The method according to claim 10, further comprising modulating the data stream with quadrature amplitude modulation.

13. The method according to claim 10, further comprising modulating the data stream with phase-shift keying.

14. The method according to claim 10, wherein the plurality of satellites comprises three satellites.

15. A satellite communication system comprising:

a plurality of satellites;

a gateway with a plurality of antennas, wherein one or more of the plurality of antennas are pointed toward more than one of the plurality of satellites; and a reference terminal with one or more antennas pointed toward the plurality of satellites and configured to receive signals from the gateway through the plurality of satellites, wherein the gateway determines an OFDM symbol time that is greater than the largest transmission time difference between the gateway and the reference terminal through the plurality of satellites;

wherein the gateway receives a data stream;

wherein the gateway converts the data stream into a plurality of data symbols multiplexed over a plurality of orthogonal sub-carriers to create an OFDM symbol, each data symbol having the same symbol time, exclusive of the cyclic prefix, as the OFDM symbol time; and wherein the gateway transmits the OFDM symbol to the reference terminal through the plurality of satellites.

16. The satellite communication system according to claim 15, wherein the relative transmission delay are transmitted over the Internet.

17. The satellite communication system according to claim 15, wherein the reference terminal is configured to transmit signals to one or more subscriber terminals.

18. The satellite communication system according to claim 15, wherein the plurality of satellites comprises three satellites.

19. A gateway comprising an input port configured to receive a data stream; and a plurality of antennas pointed toward more than one of a plurality of satellites, and configured to communicate with a plurality of subscriber terminals through the plurality of satellites, wherein the gateway is configured to transmit the data stream to one or more of the subscriber terminals using orthogonal frequency-division multiplexing (OFDM), wherein, for each subscriber terminal, the gateway determines the longest transmission time between the gateway and each subscriber terminal through each of the plurality of satellites;

wherein, for each subscriber terminal, the gateway determines the shortest transmission time between the gateway and each subscriber terminal through each of the plurality of satellites;

wherein, for each subscriber terminal, the gateway determines the transmission time difference between the longest transmission time and the shortest transmission time for each subscriber terminal;

wherein the gateway determines the largest transmission time difference among the transmission time differences for each of the plurality of subscriber terminals;

wherein the gateway determines an OFDM symbol time that is greater than the largest transmission time difference;

wherein the gateway converts the data stream into a plurality of data symbols multiplexed over a plurality of orthogonal sub-carriers to create an OFDM symbol, each data symbol having the same symbol time, exclusive of the cyclic prefix, as the OFDM symbol time; and wherein the gateway transmits the OFDM symbol to the plurality of subscriber terminals through the plurality of satellites.

20. A satellite communication system comprising:

a plurality of satellites;

a gateway with a plurality of antennas, wherein one or more of the plurality of antennas is pointed toward more than one of the plurality of satellites, and the gateway is configured to transmit a data stream using orthogonal frequency-division multiplexing (OFDM); and a plurality of subscriber terminals, wherein each of the plurality of subscriber terminals include an antenna pointed toward at least two of the plurality of satellites and are configured to receive an OFDM signal from the gateway through the plurality of satellites, wherein each subscriber terminal determines the longest transmission time between the gateway and the subscriber terminal through each of the plurality of satellites;

wherein each subscriber terminal determines the shortest transmission time between the gateway and the subscriber terminal through each of the plurality of satellites;

wherein each subscriber terminal determines the transmission time difference between the longest transmission time and the shortest transmission time for each subscriber terminal;

wherein the gateway determines the largest transmission time difference among the transmission time differences for each of the plurality of subscriber terminals;

wherein the gateway determines an OFDM symbol time that is greater than the largest transmission time difference;

wherein the gateway receives a data stream and converts the data stream into a plurality of data symbols multiplexed over a plurality of orthogonal sub-carriers to create an OFDM symbol, each data symbol having the same symbol time, exclusive of the cyclic prefix, as the OFDM symbol time; and wherein the gateway transmits the OFDM symbol to the plurality of subscriber terminals through the plurality of satellites.

* * * * *